No. 849,363. PATENTED APR. 9, 1907.
M. D. BERRY.
TREE.
APPLICATION FILED JUNE 26, 1906.
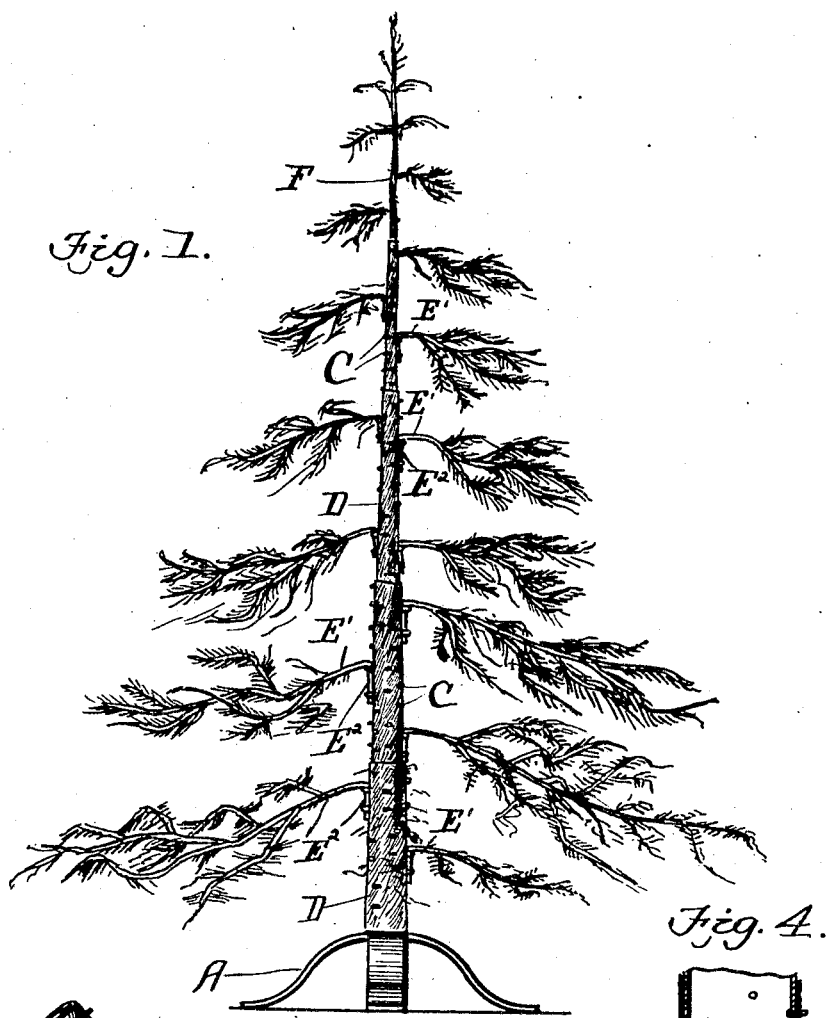
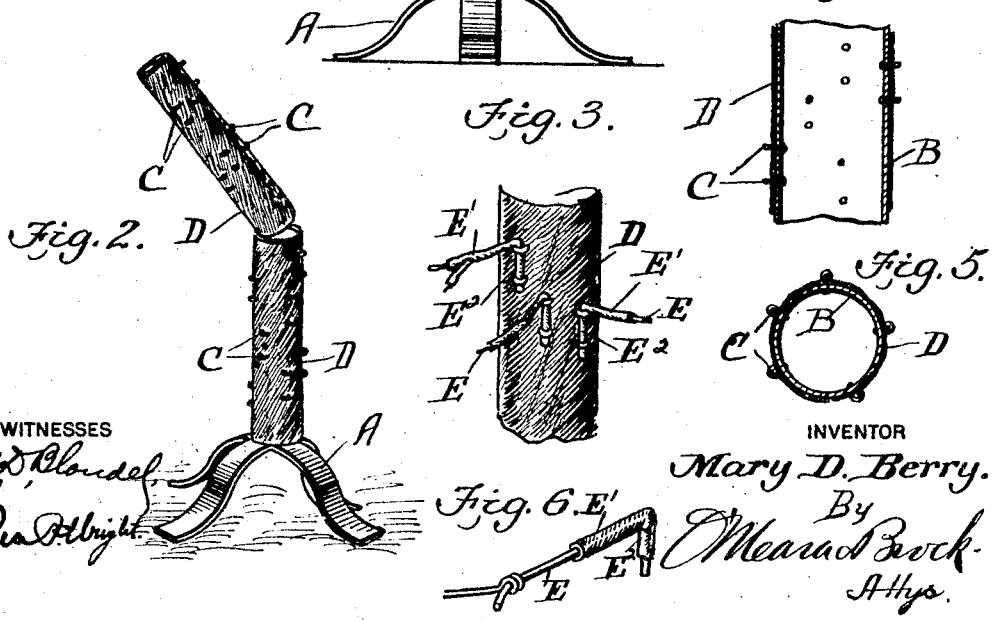
WITNESSES
INVENTOR
Mary D. Berry.

UNITED STATES PATENT OFFICE.

MARY DOTY BERRY, OF NEW MILFORD, CONNECTICUT.

TREE.

No. 849,363.     Specification of Letters Patent.     Patented April 9, 1907.

Application filed June 26, 1906. Serial No. 323,510.

*To all whom it may concern:*

Be it known that I, MARY DOTY BERRY, a citizen of the United States, residing at New Milford, in the county of Litchfield and State of Connecticut, have invented a new and useful Improvement in Trees, of which the following is a specification.

This invention relates to artificial evergreen trees, and more particularly to artificial Christmas trees, the object being to provide a tree formed of fireproof material so that all danger of its catching on fire is prevented.

Another object of my invention is to provide a tree the body of which is formed of a series of tapering hollow sections adapted to fit together, said sections being provided with sockets to receive the limbs of the tree.

This invention consists of the novel features of construction hereinafter fully described, and pointed out in the claims.

In the drawings forming a part of this specification, Figure 1 is a perspective view of my improved tree. Fig. 2 is a detail perspective view of the trunk of the tree. Fig. 3 is a detail side view of one of the sections, showing the limbs attached. Fig. 4 is a detail vertical section of one of the sections. Fig. 5 is a transverse sectional view of one of the sections. Fig. 6 is a perspective view of one of the limbs, showing the covering partly broken away.

Referring to the drawings, A indicates a base upon which is mounted a series of tapering tubes B, fitting within each other, forming the trunk of the tree. The sections are provided with eyes C, arranged in pairs, so that the eyes will be in vertical alinement with each other. An artificial bark D, formed of some fireproof material, is secured over the sections, so as to give the appearance of a tree-trunk. Limbs E are formed of wire covered with fireproof material E' to represent bark and have angled ends $E^2$, adapted to fit in the eyes C and securely support them. The limbs are provided with wire branches, covered with fireproof material having needles formed of fireproof material projecting therefrom so as to give the appearance of a real tree. A top F, formed in a similar manner, is secured in the upper tube-section, forming a complete tree, which is almost impossible to tell from a real tree when dressed.

From the foregoing description it will be readily seen that I have provided a fireproof Christmas tree so constructed that it can be taken apart and packed into a very small space after it has been used, so that it can be saved and used over and over again.

Having thus fully described my invention, what I claim as new, and desire to secure by Letters Patent, is—

1. An artificial tree comprising a base, of a plurality of tapering tube-sections arranged on said base covered with fireproof artificial bark, eyes secured to said sections, limbs having branches provided with needles secured in said eyes and a top arranged in the upper sections for the purpose set forth.

2. An artificial evergreen tree, comprising a base, a series of tapering tubes arranged on said base, covered with fireproof artificial bark, eyes extending out from said section, wire limbs provided with hooks adapted to fit said eyes covered with artificial fireproof bark, and branches carried by said limbs provided with fireproof artificial needles for the purpose set forth.

MARY DOTY BERRY

Witnesses:
J. H. MOREHOUSE,
CHAS. M. BEACH.